Dec. 15, 1959     S. J. KARDAS     2,917,464
SILVER IODIDE GENERATOR
Filed Dec. 5, 1956
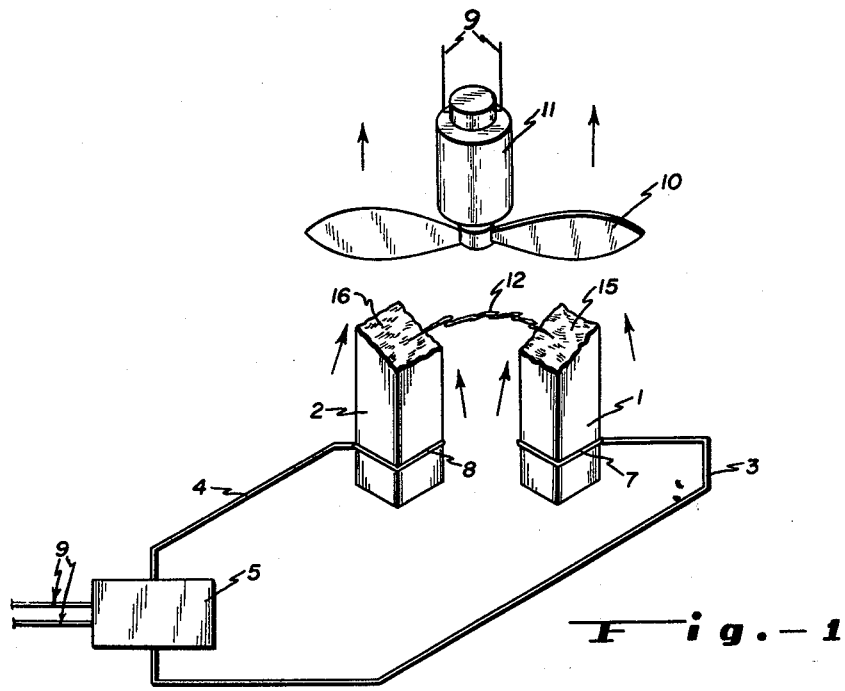
Fig. — 1
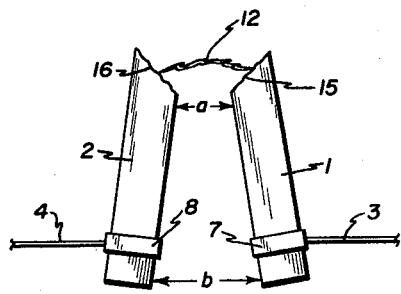
Fig. — 2
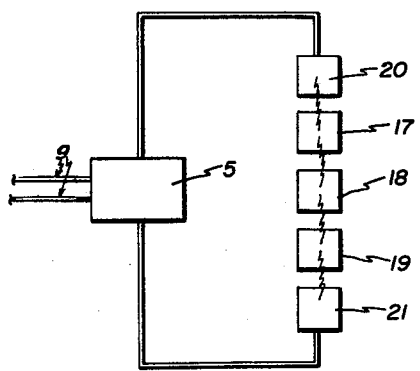
Fig. — 3
INVENTOR.
Stanley J. Kardas
BY
McGrew & Edwards
ATTORNEYS United States Patent Office 2,917,464
Patented Dec. 15, 1959

2,917,464

SILVER IODIDE GENERATOR

Stanley J. Kardas, Denver, Colo., assignor to Water Resources Development Corporation, Denver, Colo., a corporation of Colorado Application December 5, 1956, Serial No. 626,519

6 Claims. (Cl. 252—359)

This invention relates to silver iodide generators and more particularly to a silver iodide generator employing an electric arm for producing a large quantity of minute silver iodide crystals which are effective in the formation of ice crystals in super cooled water and water vapor such as is found in cloud systems, fog, etc.

In recent years, cloud seeding with various substances to increase moisture precipitation from the atmosphere has become accepted practice in many parts of the world. In one extensively-used procedure, coke is impregnated with silver iodide by soaking dry coke in an ethereal solution of silver iodide. The coke absorbs the solution and after evaporation of the solvent it leaves a deposit of silver iodide on and in the coke. The dry coke with the impregnated silver iodide is then burned in a generator and silver iodide is sublimed from the burning coke. The silver iodide vapor condenses in cooler air away from the burning coke to form minute silver iodide crystals. The silver iodide crystals are suspended in the air and rise to the atmosphere. Under proper conditions they form nuclei for forming discrete particles in the form of ice crystalets, snow flakes, etc. The use of the coke burning generators has achieved substantial success, however, for some applications it is desirable to provide features other than those available in the coke burning generator.

In this specification the term "effective crystal" has reference to a crystal which is physically capable of acting as a nucleus for converting moisture into a discrete ice particle.

It is an object of the present invention to provide a silver iodide generator of improved and simplified construction.

It is another object of the present invention, to provide an improved silver iodide generator for producing large quantities of effective silver iodide crystals and including means for passing a stream of air across the active elements of the generator for condensing silver iodide vapors which are produced thereby.

Another object of the invention is to provide a silver iodide generator which may be remotely controlled for substantial periods without requiring an operator in attendance at the generator.

A further object of the invention is to provide a silver iodide generator in which the capacity for producing silver iodide crystals is simply and effectively increased or decreased.

Briefly, in carrying out the objects of the present invention, in one embodiment thereof, an effective and simplified silver iodide generator is provided which comprises a pair of electrodes composed of a low-resistance mass of silver iodide compacted into large-cross-section, elongated electrodes. By inducing a high-voltage, low-amperage current across the electrodes, there is produced a substantial arc therebetween, and a very large quantity of effective silver iodide crystals is produced. A stream of air is forced past the electrodes in such a manner as to keep the arc at or near the top of the electrodes, to remove the silver iodide crystals from the vicinity of the arc, and to provide sufficient cooling air to quickly and efficiently condense the sublimed silver iodide into the minute crystals. The device is readily capable of being remotely controlled so that many generators may be set up in remote and substantially inaccessible places and controlled from a single station. The generator may be started and stopped at effective times by remote control units many miles away from the generator itself.

The features of novelty which characterize the invention are pointed out in the appended claims; the invention itself, however, both as to its organization and method of operation, together with further objects and advantages thereof will best be understood by reference to the following description taken in connection with the accompanying drawing in which:

Fig. 1 is a schematic view of a generator assembly, illustrating the positioning of silver iodide electrodes and a ventilating system according to the invention;

Fig. 2 is a side elevation of a pair of electrodes according to the invention, illustrating the positioning in relation to the arc path thereacross; and Fig. 3 is a top plan view of a modified generator illustrating the positioning of multiple electrodes of a high-capacity generator.

In the device illustrated in Fig. 1, a pair of silver iodide electrodes 1 and 2 are interconnected to leads 3 and 4 from a high-voltage, low-amperage transformer 5. The leads are interconnected to about the bottom of the electrodes 1 and 2 by means of conducting bands 7 and 8 respectively, forming a good conducting connection between the leads and the electrodes. The transformer for producing high-voltage, low-amperage current, is interconnected with a power line, indicated generally by numeral 9, as is well known. In a preferred application, the line 9 provides standard, commercial 110–120 volt alternating current, and the transformer 5 produces 15,000 volts alternating current at about 30 milliamperes current. A blower or fan 10, driven by an electric motor 11 draws air upwardly past the electrodes 1 and 2 as indicated by the arrows of Fig. 1. An arc, indicated by the numeral 12, arcs across the two electrodes and at the point of contact of the arc with the electrodes, silver iodide is vaporized and the air rushing past the electrodes almost immediately condenses the vapor into minute silver iodide crystals.

In one preferred form, the electrodes 1 and 2 are made of compressed silver iodide of about 5/8 inch-square cross-section rod. With each rod of about 60 grams, or a total of 120 grams of silver iodide, and using 15,000 volts alternating current at about 30 milliamperes, the generator utilizes solid silver iodide at a rate of about one gram per hour. With such a generator and electrodes, the arc is substantially continuous and the crystals are continuously produced. The large cross-section of the electrodes produces a low-resistance electrode and which readily disperses heat produced by the continuous arc.

At the indicated voltage and current and having rods of about 5/8 inch-square cross-section, the number of effective silver iodide crystals which are produced by the generator is about $10^{15}$ crystals per gram of silver iodide vaporized from the electrodes. Under normal conditions, such a generator will produce from between $10^{16}$ to $10^{17}$ crystals per gram of silver iodide; however, not all of the crystals produced are effective in forming nuclei which produce ice crystals. The total number of crystals actually produced can be calculated by using an electron microscope. Since the sizes of the crystals produced are too small to be seen even in a high-magnification optical microscope, an electron microscope is substantially the only method of measuring the number of crystals actually produced. The effective number of crystals may be determined, however, by injecting a known volume of air and crystals omitted from the generator into a known volume of air which is kept substantially below the freezing point. By injecting moist air into the cold air containing silver iodide crystals, ice crystals form on the effective silver iodide crystals. The ice crystals which are formed fall on plates placed at the bottom of the cold air container, and an actual count may be used in calculating the actual ice crystals which have formed, and the number of effective silver iodide crystals may be calculated. Using this method, it is determined that the production of crystals from the device of the present invention exceeds $10^{15}$ crystals per gram of silver iodide volatilized. The rate of discharge of silver iodide crystals from the electrodes may be controlled, however, by changing the composition of the electrodes, as, for example, by compressing the silver iodide with small amounts of carbon or other inert matter, or by adding additional silver iodide rods between the electrodes, or by changing the voltage and amperage to the electrodes.

It is important that the vapor be condensed as soon as possible after being formed since it has been discovered that more effective crystals are formed when the silver iodide is condensed almost immediately on being vaporized. For field use, the electrodes, fan and the transformer are suitably housed in a cabinet with a vent for the air and silver iodide crystals exhausting from the fan 10. A suitable inlet is provided for air which is drawn across the electrodes, through the fan and subsequently out through the vent. Normally, the generator is placed in the desired location of the country exposed to all atmospheric conditions, and it is therefore obvious that the motor and the transformer should be protected from the effects of the weather. The device may be mounted in a very simple cabinet, and by having the motor 11 interconnected with the power line 9, a remotely controlled unit is very easily established. By simply impressing a current on the power line 9 the generator may be remotely operated. For example, with the electrodes of about 120 grams total, and at a usage of about one gram per hour, it is seen that the generator may be operated continuously for about 120 hours or intermittently for a total of 120 hours without the requirement of physical attendance at the generator location. Larger electrodes may be used so that the generator may be operated a substantially longer period.

Since the electrodes must be placed in relatively close proximity to each other, it may be desirable to tilt the electrodes closer together at the top of the electrodes. This is illustrated in Fig. 2 where the electrodes 1 and 2 are positioned closer together at the top $a$ than at the bottom $b$. In this manner an arc 12 stays at about the top of the electrodes, and the arc tends to erode a diagonal-shaped face 15 on electrode 1 and a diagonal-shape face 16 on electrode 2, substantially facing one another. The air passing the electrodes and the action of the arc itself in moving from spot-to-spot, keeps the erosion of each electrode substantially uniform down the length thereof.

Where it is desired to have a high-capacity machine, three or more electrodes may be utilized. In the modification illustrated in Fig. 3, three electrodes 17, 18, and 19 are spaced in parallel series in line with the two main electrodes, 20 and 21, and the electricity substantially uniformly arcs between the three electrodes and the main electrodes 20 and 21. In this manner, several arcs may be operating on the same machine, thereby increasing the volume of silver iodide crystals produced by the device, since each arc will produce about the same amount of silver iodide vapor. With such a generator the current impressed on the electrodes must be increased so as to maintain the arcs between the electrodes.

The device illustrated is described as using 15,000 volts alternating current; however, the voltage may be changed so long as a continuous arc is obtained. By adjusting the size of the electrodes and the distance apart, voltages from 7000 volts alternating current or more may be used. The preferred form of 15,000 volts, however, produces satisfactory results. The blower may be used to blow air across the electrodes, or it may be used to draw the air across as illustrated.

While the invention has been illustrated with reference to specific devices, there is no intent to limit the spirit and concept thereof to the precise details so set forth, except insofar as defined in the following claims.

I claim:

1. A generator for producing an aerial suspension of minute, effective silver iodide crystals comprising at least a pair of spaced-apart electrodes arranged to pass a substantially continuous electric arc therebetween, each of said electrodes comprising essentially a compact mass of silver iodide of substantial cross section to provide a low-resistance, high-heat dispersive electrode, means for passing a stream of air over said electrodes so as to condense vaporized silver iodide and then remove the resultant crystals, and means for impressing a high-voltage, low-amperage current on said electrodes.

2. A generator for producing an aerial suspension of minute, effective silver iodide crystals comprising at least a pair of spaced-apart and adjacent electrodes arranged to pass a high-voltage low-amperage alternating current arc therebetween, each of said electrodes comprising essentially a compacted mass of silver iodide of substantial cross section to provide a low-resistance high-heat dispersive electrode, means for passing a stream of air over said electrodes so as to condense vaporized silver iodide and then remove the resultant crystals, and means for impressing an electric high-voltage, low-amperage current on said electrodes.

3. A generator for producing an aerial suspension of minute, effective silver iodide crystals comprising at least a pair of spaced-apart electrodes arranged to pass a high-voltage low-amperage current arc therebetween, each of said electrodes comprising essentially a compacted mass of silver iodide of substantial cross section to provide a low-resistance, high-heat dispersive electrode, means for passing a stream of air over said electrodes so as to condense vaporized silver iodide and then remove the resultant crystals, and means for inducing a low-amperage alternating current of at least about 7,000 volts and through said electrodes.

4. A generator for producing an aerial suspension of minute, effective silver iodide crystals comprising a pair of upright, spaced-apart and adjacent electrodes arranged to pass a high-voltage, low-amperage electric arc therebetween, each said electrode comprising essentially a compacted mass of silver iodide crystals of substantial length and cross section whereby to provide a low-resistance, high-heat dispersive electrode, blower means arranged to pass a stream of air over said electrodes in an upward direction so as to condense vaporized silver iodide and then remove the resultant crystals, and means for inducing a high-voltage, low-amperage current through said electrodes.

5. A generator for producing an aerial suspension of minute, effective silver iodide crystals comprising a pair of upright, spaced-apart electrodes arranged to pass a high-voltage, low-amperage alternating current electric arc therebetween, each said electrode comprising essentially a compacted mass of silver iodide crystals of substantial length and cross section whereby to provide a low-resistance, high-heat dispersive electrode, blower means arranged to pass a stream of air over said electrodes in an upward direction so as to condense vaporized silver iodide and then remove the resultant crystals, and means for impressing a high-voltage, low-amperage alternating current through said electrodes.

6. A remotely controlled generator for producing an aerial suspension of minute, effective silver iodide crystals comprising a pair of upright spaced-apart electrodes arranged to pass a high-voltage, low-amperage electric arc therebetween, each said electrode comprising essentially a compacted mass of silver iodide crystals of substantial length and cross section whereby to provide a low-resistance high-heat dispersive electrode, blower means arranged to pass a stream of air over said electrodes in an upward direction so as to condense vaporized silver iodide and then remove the resultant crystals, transformer means for producing a high-voltage, low-amperage current, means connecting said transformer and said electrodes, an electric motor for operating said blower, a power line interconnected with said motor and said transformer, and means inclusive of a remote control station for impressing a current on said power line to simultaneously produce an arc between said electrodes and operate said blower.

References Cited in the file of this patent

UNITED STATES PATENTS

| | | |
|---|---|---|
| 1,801,784 | Schwarz | Apr. 21, 1931 |
| 1,910,212 | Brown | May 23, 1933 |
| 2,606,270 | Vonnegut | Aug. 5, 1952 |
| 2,658,169 | Barret | Nov. 3, 1953 |
| 2,665,940 | MacCready | Jan. 12, 1954 |

UNITED STATES PATENT OFFICE
CERTIFICATE OF CORRECTION

Patent No. 2,917,464                                December 15, 1959

Stanley J. Kardas

It is hereby certified that error appears in the printed specification of the above numbered patent requiring correction and that the said Letters Patent should read as corrected below.

Column 1, line 17, for "arm" read -- arc --.

Signed and sealed this 7th day of June 1960.

(SEAL)
Attest:

KARL H. AXLINE                                    ROBERT C. WATSON
Attesting Officer                                 Commissioner of Patents